United States Patent
Eller et al.

(10) Patent No.: US 10,987,754 B1
(45) Date of Patent: Apr. 27, 2021

(54) CONTINUOUS FEED METHOD FOR FRICTION STIR PROCESSING

(71) Applicant: Lockheed Martin Corporation, Bethesda, MD (US)

(72) Inventors: Michael R. Eller, New Orleans, LA (US); Zhixian Li, Slidell, LA (US)

(73) Assignee: LOCKHEED MARTIN CORPORATIONN, Bethesda, MD (US)

( * ) Notice: Subject to any disclaimer, the term of this patent is extended or adjusted under 35 U.S.C. 154(b) by 388 days.

(21) Appl. No.: 15/952,165

(22) Filed: Apr. 12, 2018

Related U.S. Application Data

(60) Provisional application No. 62/484,593, filed on Apr. 12, 2017.

(51) Int. Cl.
 *B23K 20/00* (2006.01)
 *B23K 20/12* (2006.01)

(52) U.S. Cl.
 CPC ...... *B23K 20/1225* (2013.01); *B23K 20/1275* (2013.01)

(58) Field of Classification Search
 CPC ......... B21C 1/24; B21C 23/085; B21C 25/02; B21C 25/04; B23K 20/12; B23K 20/122; B23K 20/1275
 See application file for complete search history.

(56) References Cited

U.S. PATENT DOCUMENTS

| | | | |
|---|---|---|---|
| 2,591,928 A * | 4/1952 | Goldman | B27D 1/086 144/268 |
| 2,944,448 A * | 7/1960 | Braatz | B21J 7/16 72/76 |
| 4,917,858 A | 4/1990 | Eylon et al. | |
| 7,311,873 B2 | 12/2007 | Moxson et al. | |
| 8,875,976 B2 | 11/2014 | Schultz et al. | |
| 2015/0075242 A1 | 3/2015 | Eller et al. | |

* cited by examiner

*Primary Examiner* — Erin B Saad
(74) *Attorney, Agent, or Firm* — Morgan, Lewis & Bockius LLP

(57) ABSTRACT

A continuous feed method for friction stir processing includes continuously feeding a tubular material having a first grain microstructure from a bulk source into a processing chamber, and forcing the tubular material between a die and a textured end portion of a mandrel as the tubular material is advanced through the chamber. The continuous feed method further includes rotating the mandrel within the tubular material while forcing the tubular material across the textured end portion to friction stir process the tubular material and transform a structure of the tubular material from the first grain microstructure to a second grain microstructure. The second grain microstructure is a finer equiaxed grain microstructure than the first grain microstructure. The method further includes converting the tubular material having the second grain microstructure into a stiffened sheet form.

12 Claims, 8 Drawing Sheets

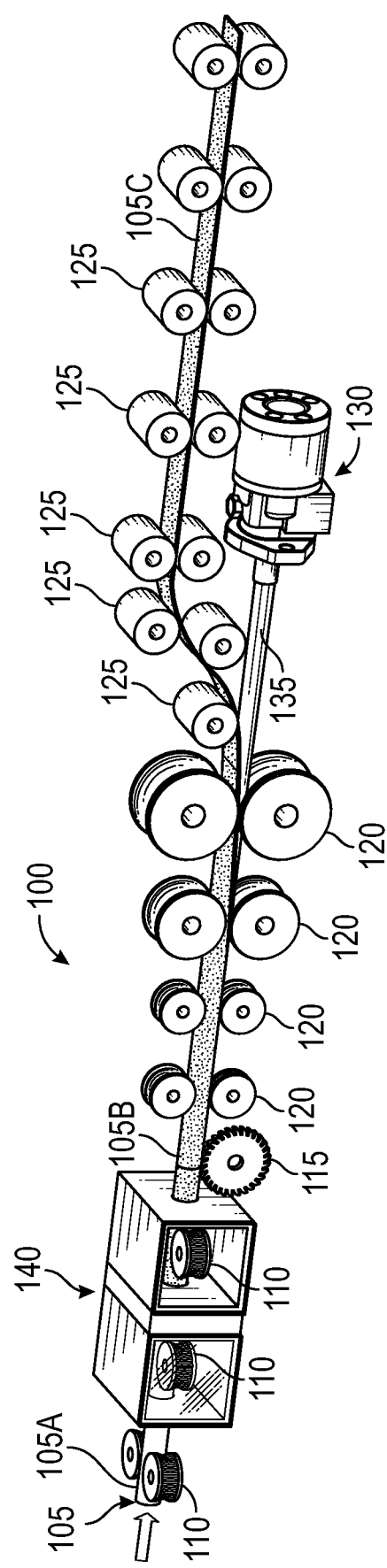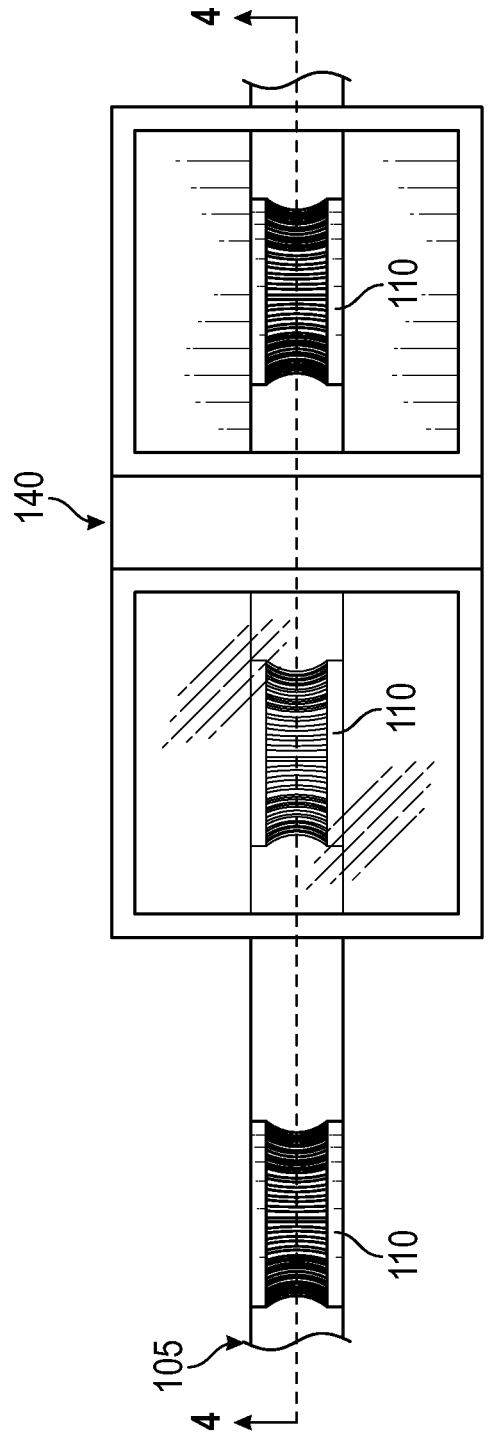
FIG. 2
FIG. 3

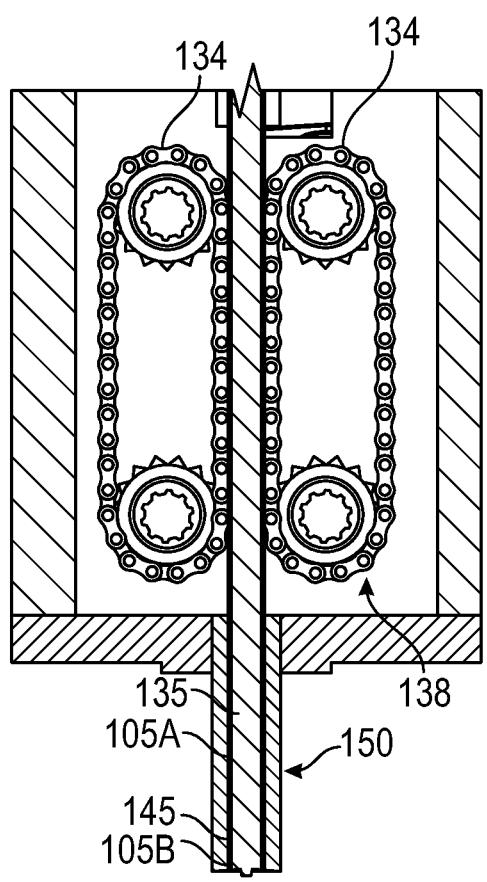
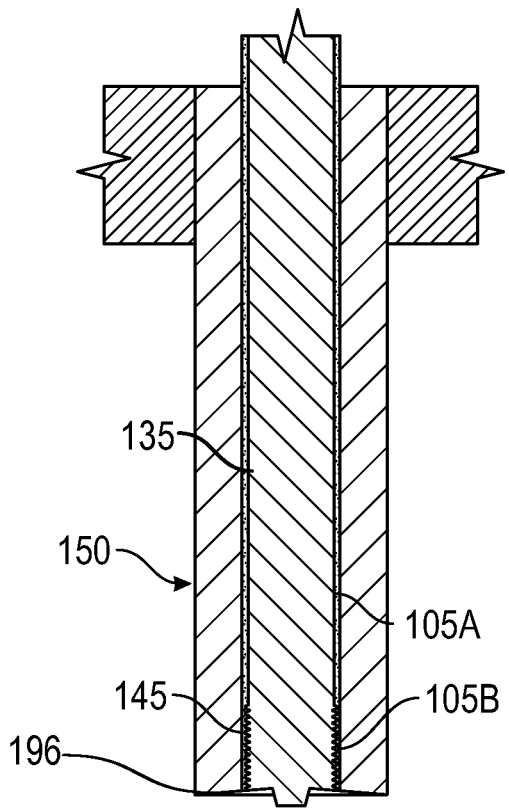
FIG. 9C
FIG. 10

CONTINUOUS FEED METHOD FOR FRICTION STIR PROCESSING

CROSS-REFERENCE TO RELATED APPLICATIONS

This application claims priority under 35 U.S.C. § 119 to Provisional Application No. 62/484,593 filed on Apr. 12, 2017, in the United States Patent and Trademark Office.

STATEMENT REGARDING FEDERALLY SPONSORED RESEARCH OR DEVELOPMENT

Not Applicable.

TECHNICAL FIELD

The present description relates in general to friction stir processing, and more particularly to, for example, without limitation, continuous feed method for friction stir processing.

BACKGROUND

The description provided in the background section should not be assumed to be prior art merely because it is mentioned in or associated with the background section. The background section may include information that describes one or more aspects of the subject technology.

Friction Stir Processing (FSP) is an agglomeration of methods that change the properties of metals and metal matrix composites (MMC) through localized Severe Plastic Deformation (SPD). The resultant Ultra Fine Grain (UFG) microstructure exhibits metallurgical properties that are superior to other mainstream thermomechanical processing methods. UFG enables higher ductility (formability), higher strength, and higher corrosion resistance. FSP is typically applied to the entire material "in bulk" whereas Friction Stir Welding (FSW) is applied only at seams of materials to be joined. In the simplest form, FSP would entail the use of a FSW to produce 100% overlapping on a given substrate or workpiece.

The description provided in the background section should not be assumed to be prior art merely because it is mentioned in or associated with the background section. The background section may include information that describes one or more aspects of the subject technology.

SUMMARY

In one or more implementations, a continuous feed method for friction stir processing is provided that includes continuously feeding a tubular material having a first grain microstructure from a bulk source into a processing chamber, and forcing the tubular material between a die and a textured end portion of a mandrel as the tubular material is advanced through the chamber. The method further includes rotating the mandrel while forcing the tubular material across the textured end portion to friction stir process the material. The friction stir processing of the tubular material transforms a structure of the material from the first grain microstructure to a second grain microstructure. The second grain microstructure is a finer equiaxed grain microstructure than the first grain microstructure. The method further includes converting the tubular material having the second grain microstructure into a stiffened sheet form.

In one or more implementations, a system for performing friction-stir processing includes a first set of rollers, a rotating mandrel including a textured distal end portion, and a second set of rollers. The first set of rollers is configured to receive, grip, and translate a tubular material having a first grain microstructure from a bulk source into a processing chamber for processing. The first set of rollers is configured to advance the tubular material through the textured end portion of the mandrel. The textured end portion is configured to friction-stir process the material from the first grain microstructure to a second finer equiaxed grain microstructure. The second set of rollers are configured to receive, flatten, and translate the tubular material having the second grain microstructure from an interior of the chamber to an exterior thereof for cooling to retain the second grain microstructure.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 2 illustrates a continuous feed system for performing the continuous feed method of FIG. 1, according to some embodiments of the present disclosure.

FIG. 3 illustrates a side view of a friction stir processing stage of the continuous feed method of FIG. 1, according to some embodiments of the present disclosure.

FIG. 9C illustrates a stage of advancing the formed tubular material of FIGS. 9A and 9B to a textured portion of a rotating mandrel for friction stir processing.

FIG. 10 is an enlarged partial view illustrating advancement of the tubular material of FIG. 9C to the textured portion of the rotating mandrel for friction stir processing.

DETAILED DESCRIPTION

Figure 1:
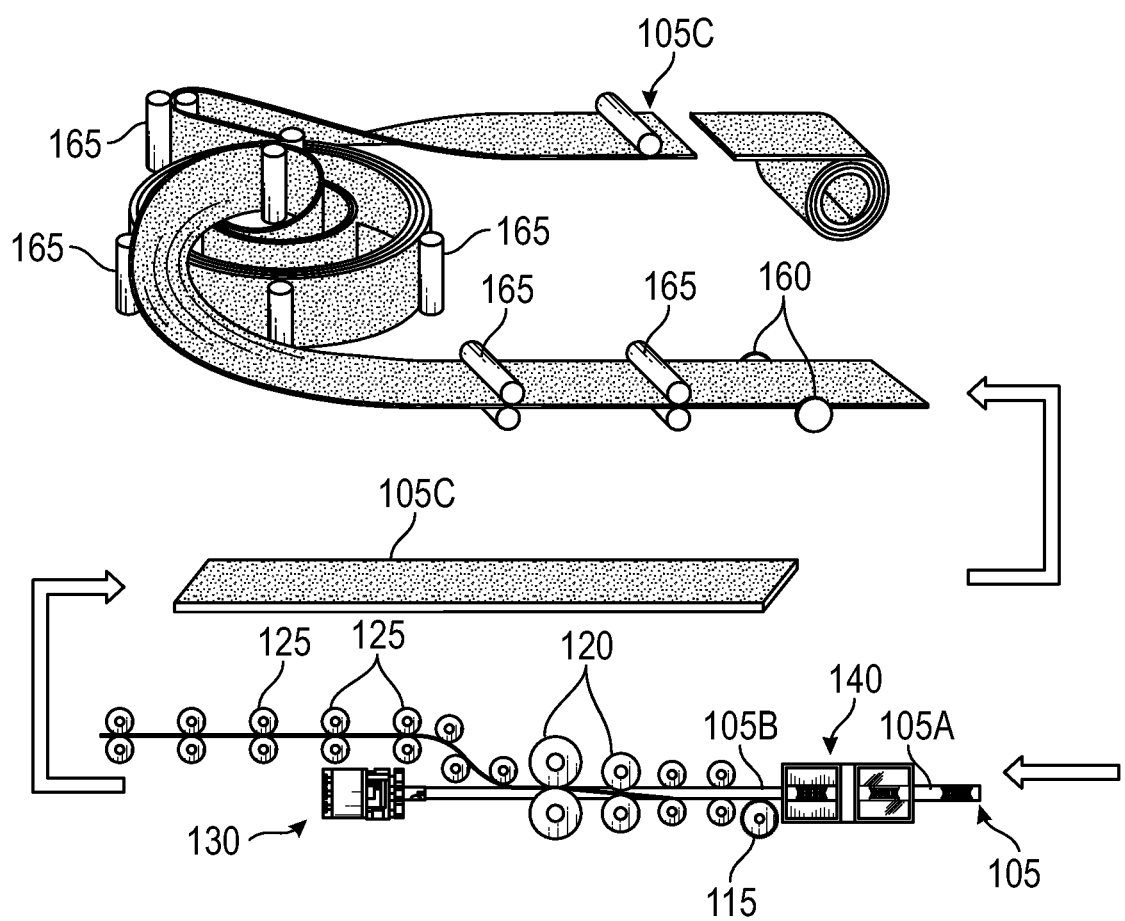
FIG. 1 illustrates a process flow for a continuous feed method for friction stir processing, according to some embodiments of the present disclosure.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Various aspects of the present disclosure are directed to investigation of the enhancement of material properties, in particular, the enhancement of a grain microstructure of metals such as intermetallic alloy Titanium Aluminide (TiAl) and TiAl Metal Matrix Composites (MMCs) using continuous feed friction stir processing (FSP). FSP is an agglomeration of methods that change the properties of metals and metal matrix composite (MMC) through localized Severe Plastic Deformation (SPD). The resultant Ultra Fine Grain (UFG) microstructure exhibits metallurgical properties that are superior to other mainstream thermomechanical processing methods. The UFG microstructure enables higher ductility (formability), higher strength (via Hall-Petch equation), and higher corrosion resistance (due to the resulting cleaner grain boundaries with less dispersed particles). Performing FSP yields an additional benefit over performing traditional Friction Stir Welding (FSW) in that FSP may be applied to an entire material "in bulk," whereas FSW is applied only at seams of materials to be joined. In the simplest form, FSP would entail the use of a Friction Stir Welding (FSW) to produce 100% overlapping on a given substrate or workpiece.

More recent FSP methods include Friction Stir Extrusion (FSE) and Additive Friction Stir (AFS). FSE methods are covered in the U.S. Patent Publication No. 2015/0075242, incorporated herein by reference as if fully set forth herein, but utilize a billet or tubular blank feedstock that are friction stir processed with a stirring mandrel tool as they are extruded into a thinner tubular product with an equiaxed UFG microstructure. Since the feedstocks described in U.S. Patent Publication No. 2015/0075242 are not continuously fed into the FSE chamber, the methods require reloading of new billets or tubular blanks similar to a traditional extrusion process. In accordance with various embodiments described herein, the continuous feed friction stir processing (FSP) methods described herein incorporate aspects of one or more of FSW, friction stir extrusion (FSE), and additive friction stir (AFS).

Various embodiments of the present disclosure are directed to enhancing the properties of metals such as intermetallic alloy Titanium Aluminide (TiAl) and TiAl Metal Matrix Composites (MMCs) using continuous feed friction stir processing (FSP). TiAl has long been sought after for hot structures in supersonic and hypersonic vehicles because of its unmatched specific strength at elevated temperatures (up to 1600° F.) where it can achieve over 50% mass savings compared to the incumbent Nickel-based superalloys. TiAl has been adopted in commercial turbine engines for low pressure turbine blades. However, the TiAl materials conventionally used are limited to a cast or extruded product form. In order for TiAl to reach its full potential for supersonic and hypersonic vehicles, the material must be able to be used in sheet, plate, or stiffened structural product forms. Currently, these highly desirable sheet, plate, or stiffened structural TiAl product forms are difficult to produce and overwhelmingly limited by very poor room temperature ductility (1-3% elongation). The low ductility translates to very limited formability and workability as well as structural failure mode concerns. Accordingly, the systems and methods described herein are directed to achieving UFG microstructures, and therefore increased ductility that will provide a resulting TiAl material in a more viable sheet form which can then be used for desired manufacturing applications, e.g., aerospace and defense to name a few.

Various aspects of the present disclosure are directed to a continuous feed method for friction stir processing, primarily with friction stir extrusion (FSE) and additive friction stir (AFS), to produce bulk materials with ultrafine grain microstructure and corresponding mechanical property enhancements such as ductility, strength, and corrosion resistance. These enhanced mechanical properties allow the materials and alloys (particularly titanium aluminide) having the properties to be utilized for lightweight and high-performance applications, for example, in aerospace and defense. In contrast, conventional FSP methods are not performed in a sustainable and continuous manner and therefore cannot realize the enormous potential for microstructural enhancement of metals, intermetallic alloys such as titanium aluminide, and metal matrix composites. Since conventional FSP methods generally require significant repositioning of tools and fixtures and/or reloading of material feedstocks, the discontinuous nature reduces the economic viability and widespread industry adoption of these conventional FSP methods.

In accordance with various embodiments, the continuous feeding FSP systems and methods described herein advantageously enable economically-viable production of materials with UFG microstructures. Conventional FSP methods are capable of producing materials having finer grain microstructure only through very extensive, multi-step thermomechanical processing and heat treatment. Additionally, the UFG microstructure size achieved with FSP methods of the various embodiments described herein is superior to the aforementioned conventional extensive, multi-step thermomechanical processing methods. In contrast to the extensive and expensive thermomechanical processing methods conventionally used, the systems and methods of the various embodiments described herein advantageously provide a continuous feeding method for producing metallic products having superior UFG microstructure and corresponding mechanical property enhancements at a high-volume and competitive cost. The economics of continuous feeding tube mill products (as described in various embodiments herein) versus traditionally extruded products are proven to be cheaper with the continuous processes.

FIG. 1 illustrates a process flow for a continuous feed method for friction stir processing, according to some embodiments of the present disclosure. According to various aspects of the present disclosure, a continuous feed method for friction stir processing may include various stages. In the depicted embodiments, the continuous feed method includes a friction stir processing stage, a cutting and flattening stage, and a material diverting stage. The friction stir processing stage begins with continuously feeding a material 105A having a first grain microstructure from a bulk source into a processing chamber 140. In some embodiments, the bulk source may be a reel of either tubular or sheet material. The material may be either a preformed real of continuous tubing or a real sheet tubing that acts as the continuous feed source for the continuous feed method described herein. This is in contrast to conventional friction stir processing methods which utilize feedstock in the form of a billet or other form of blank thereby necessitating the need to have to reload individual billets were blanks in order to produce a resulting product having the desired dimensions. The term continuous feed as described herein refers to a method and configuration in which the need to constantly reload individual billets is obviated by starting off with a bulk form of material, which can then be fed into the process continuously. The aforementioned configuration is advantageous in the sense that the systems and methods described herein are capable of processing such a bulk form of material in a way that conventional friction stir processing methods have failed to achieve. The continuous feed method allows for continuous friction stir processing resulting in a material having superior ultrafine grain (UFG) properties in comparison with those produced using conventional friction stir processing methods.

In some aspects, an initial feed material 105 may be a material having a potentially non-ideal microstructure. For example, the material 105 may be a starting material having a coarse grain microstructure. Various embodiments described herein are directed to enhancing the properties of metals such as intermetallic alloy Titanium Aluminide (TiAl) and TiAl Metal Matrix Composites (MMCs). Thus, the starting material 105 may be a metal or metal composite such as intermetallic alloy Titanium Aluminide (TiAl) and TiAl Metal Matrix Composites (MICs) having for example, poor room temperature ductility (1-3% elongation) translating to significantly limited formability and workability.

In the friction stir processing stage, the material 105 is transformed in structure by subjecting an inner diameter thereof to a textured portion 145 of the rotating mandrel 135 (illustrated in FIG. 2). In particular, the grain microstructure of the material 105 is transformed from the first non-ideal grain microstructure (illustrated as material 105A) to a second grain microstructure having superior metallurgical properties as compared to the first grain microstructure. For example, the second grain microstructure is a finer equiaxed grain microstructure as compared to the first grain microstructure. Thus, due to the resulting cleaner grain boundaries with less dispersed particles, the friction stir processed material 105 (illustrated as material 105B) may have an enhanced structure, for example, higher corrosion resistance. After the friction stir process stage, the friction stir processed material 105B having the ultrafine grain (UFG) microstructure is advanced to the exterior of the chamber 140 and into the cutting and flattening stage.

In the cutting and flattening stage, the friction stir processed tubular material 105B is cut longitudinally using a blade 115 to allow the tubular material 105B to begin to open up. The opened up tubular material 105B is then flattened into sheet form (illustrated as 105C) using a series of rollers 120 which increase progressively in size until the flattened material reaches the material diverting stage. In the material diverting stage, yet another set of rollers 125 are provided and positioned in such a way to redirect the flattened sheet material away from a motor 130 which drives the mandrel 135 (illustrated in FIG. 2).

In accordance with some embodiments, the continuous friction stir processing methods may include additional processing steps such as cooling, heat treating, pickling, cleaning, and any other additional desirable processing depending on final use of the processed UFG microstructure sheet material. Additionally, the UFG microstructure sheet material may be subject to additional dimensioning and precision processing steps, for example, edge milling, using edge millers 160, and flat rolling, using rollers 165, to ensure a consistent width and flatness of the UFG sheet material 105C.

FIG. 2 illustrates a continuous feed system 100 for performing the continuous feed method of FIG. 1, according to some embodiments of the present disclosure. In the depicted embodiments, the continuous feed system 100 includes a first set of rollers 110 configured to receive, grip, and translate the tubular feed material 105A having a first grain microstructure from the bulk source into the processing chamber 140 for processing during the FSP stage. The first set of rollers 110 may be any rollers capable of gripping the tubular feed material 105A and rotating so advance the tubular feed material 105A into the processing chamber 140. For example, as illustrated, the rollers 110 may be concavely shaped with curves corresponding in shape and size to the curvature of the tubular feed material 105. This way, the rollers 110 are able to grip and translate the tubular feed stock 105A effectively into the chamber 140 for processing. The chamber 140 may be a weld box in which the FSP occurs, and shall be described in further detail with respect to FIGS. 4 and 5. Optionally, the chamber 140 may be argon controlled so as to prevent oxidation of the tubular feedstock material 105 at the elevated temperatures occurring during FSP.

In accordance with some embodiments, the continuous feed system 100 further includes a blade 115, for example, but not limited to a saw positioned outside of the processing chamber 140. The saw 115 is positioned so as to slice the friction stir processed tubular material 105B exiting the chamber 140, and shall be described in further detail with respect to FIGS. 5A and 5B. As further illustrated in FIG. 2, the continuous feed system 100 may further include a second set of rollers 120 configured to receive, flatten, and translate the tubular material 105B exiting the processing chamber 140. Upon exiting the chamber 140, the tubular material 105B is immediately cooled, in order to retain the UFG microstructure provided by the FSP.

In accordance with some embodiments, the continuous feed system 100 further includes a motor 130 which is configured to provide the rotational power to drive the mandrel 135. The motor 130 is coupled to the mandrel 135 and an end portion thereof which is opposite to the textured end portion 145. The size and specifications of the motor 130 may vary based on the size of the tubing to be used and other process-specific considerations. As further depicted, continuous feed system 100 may further include a third set of rollers 125 positioned to receive the flattened material 105C from the second set of rollers 120, and configured to divert the flattened material away from contacting the motor 130.

The methods for performing the various embodiments described herein shall now be discussed in further detail below. The tubular feed material 105 shall be described here in in terms of three different forms including the initial tubular feedstock 105A transported by the first set of rollers 110 and having the non-ideal grain microstructure, the friction stir processed tubular feedstock 105B, and the flattened sheet feedstock 105C produced as a result of the cutting and flattening stage.

Figure 4:
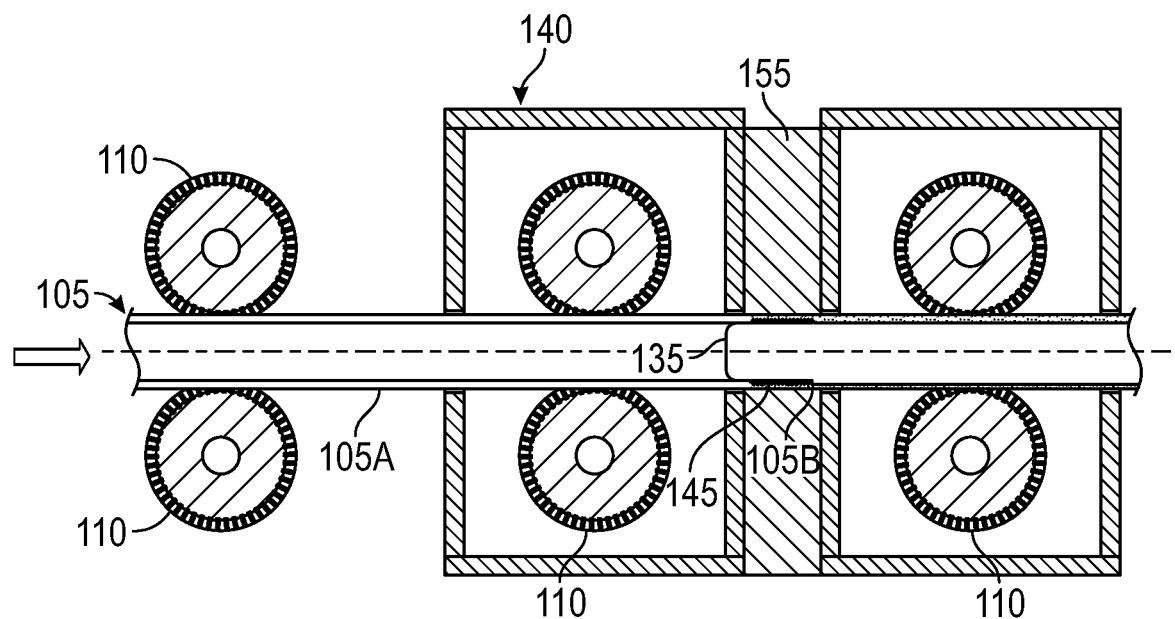
FIG. 4 is a cross-sectional view of the first stage of the continuous feed method along line 4-4 of FIG. 3 including a rotatable mandrel for performing friction stir processing, according to some embodiments of the present disclosure.
Figure 5:
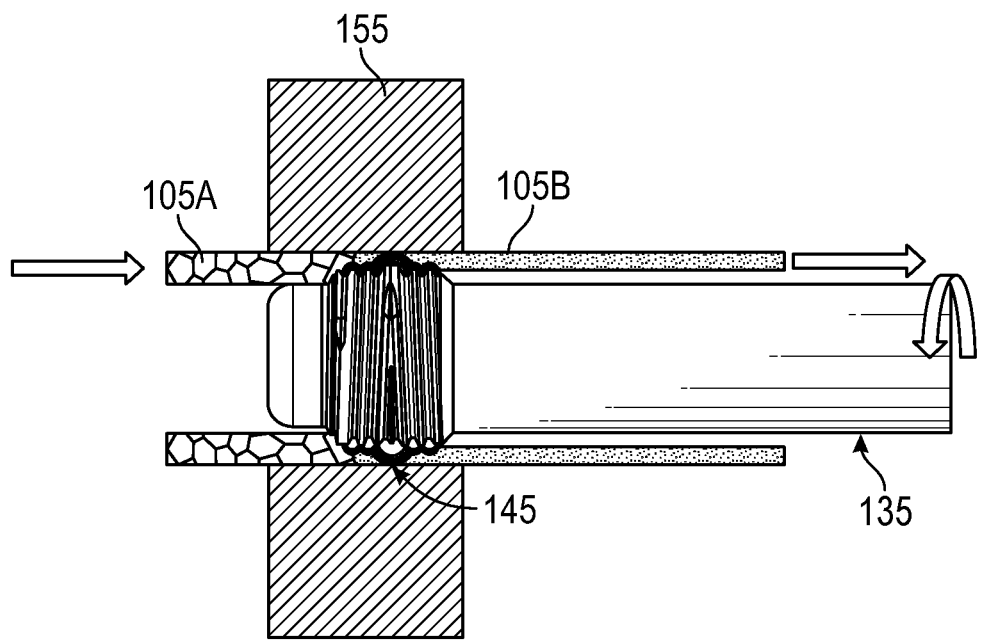
FIG. 5 is a partial enlarged view of the rotating mandrel of FIG. 3 illustrating the friction stir processing, according to some embodiments of the present disclosure.

FIG. 3 illustrates a side view of the friction stir processing stage of the continuous feed method of FIG. 1, according to some embodiments of the present disclosure. FIG. 4 is a cross-sectional view of the first stage of the continuous feed method along line 4-4 of FIG. 3 including a rotatable mandrel for performing friction stir processing, according to some embodiments. FIG. 5 is a partial enlarged view of the rotating mandrel of FIG. 3 illustrating the friction stir processing, according to some embodiments.

As depicted in the embodiments illustrated in FIGS. 3-5, the tubular feedstock material 105 is fed into the chamber 140 using first set of rollers 110. In some aspects, the first set of rollers 110 may be pinch rollers such that the rollers 110 are shaped convexly, so as to accommodate the curvature of the tubular feed material 105. FIG. 3 illustrates in further detail an exemplary configuration of the first set of rollers 110. However, the various embodiments described herein are not limited to this shape. The first set of rollers 110 can have any conceivable shape capable of gripping and transporting or advancing the initial tubular material 105 from the bulk source and through the chamber 40. FIGS. 4 and 5 illustrate in further detail how the initial tubular feed material 105A is advanced into the chamber 140 where the grain microstructure of the tubular material 105 is converted from the first non-ideal microstructure to the UFG microstructure through FSP. The continuous feed process described above provides an advantage over prior art friction stir processes in that it provides a configuration in which the need to constantly reload individual billets is obviated by starting off with a bulk source of material, which is fed into the process continuously in a tubular form. The curvature of pinch rollers 110 allows for the tubular material to be gripped and advanced through the process continuously, thereby obviating the need to constantly reload billets or blanks.

In the FSP stage, the first set of rollers 110 work to force the tubular material 105A between the die 155 and the textured end portion 145 of the rotating mandrel 135 as the material is advanced through the chamber 140. That is, the textured end portion of the mandrel 135 may be advanced into the die in conjunction with forcing the tubular material 105A over the rotating mandrel 135 using a tube gripper (e.g., rollers 110). The textured end portion includes, but is not limited to features, such as threads, ridges, studs, or protrusions. The motor 130 is used to drive rotation of the mandrel 135 such that as the tubular material 105A is forced across the textured portion 145 of the rotating mandrel 130. The tubular material 105A may, for example, be forced in the direction of the arrow along the length of the mandrel 135, thereby causing localized severe plastic deformation (SPD) of the tubular feed material 105A. The SPD results in the tubular material 105A transforming from the first non-ideal grain microstructure to the second USG microstructure that exhibits metallurgical properties that are superior to that of the first grain microstructure, as illustrated in FIG. 5.

In order to achieve the aforementioned severe plastic deformation, the friction stir mandrel 135 may be configured to rotate while the tubular feed material 105A remains rotationally stationary. Likewise, the mandrel 135 may be configured to remain rotationally stationary while the tubular feed material 105A rotates. In some aspects, a diameter of the textured end portion 145 of the mandrel 135 is slightly larger than an inside diameter of the tubular feed material 105A, yet smaller than an outside diameter of the tubular feed material 105. In some embodiments, the mandrel 135 may be integrally formed with the die 155. In yet other aspects, the mandrel 135 may be configured to be drawn into the die 155 in conjunction with drawing the tubular feed material 105A over the mandrel 135. The mandrel 135 is configured to pierce through the cross-section of the tubular feed material 105A, and in this manner cause severe plastic deformation and grain refinement of the tubular material. The various embodiments described herein are thus capable of providing microstructure refinement of an entire cross-section of a tubular feed material that is continuously fed into mandrel and die section of the process. Processing the material in bulk tubular form is advantageous in that it allows for the rotating mandrel to continuously perform friction-stir processing through the cross-section of the tubing. The tubing can then be cut and opened up to yield sheet material, e.g., TiAl sheets, as wide as 75 inches. This is in contrast, for example, with conventional systems and methods of producing titanium alloy sheets, e.g., Ti-6Al-4V, which lack the capability of producing titanium alloy sheets having a UFG microstructure in widths above 48 inches. The various embodiments as described herein may thus provide advantages of a resultant material with a very fine grain size, high resistance to corrosive environments, both on the surface and the interior of the resulting tubular material, and high mechanical properties such as bending, fatigue, and fracture toughness.

In accordance with some embodiments, the tubular feed material can include a metal, or a metal alloy, such as aluminum or an aluminum alloy. In particular, as discussed above, various embodiments described herein are directed to enhancing the properties of metals such as intermetallic alloy Titanium Aluminide (TiAl) and TiAl Metal Matrix Composites (MMCs). TiAl has long been sought after for hot structures in supersonic and hypersonic vehicles because of its unmatched specific strength at elevated temperatures (up to 1600° F.) where it can achieve over 50% mass savings compared to the incumbent Nickel-based superalloys. However, the TiAl materials conventionally used are limited to a cast or extruded product form. In order for TiAl to reach its full potential for supersonic and hypersonic vehicles, the material must be able to be used in sheet, plate, or stiffened structural product forms. Currently, these highly desirable sheet, plate, or stiffened structural TiAl product forms are difficult to produce and overwhelmingly limited by very poor room temperature ductility (1-3% elongation). The low ductility translates to very limited formability and workability as well as structural failure mode concerns.

The various embodiments of the present disclosure thus allow the forming of a resulting material, e.g., a TiAl material, having superior ultrafine grain (UFG) properties in a stiffened sheet product form. This is achieved by either starting out with a bulk tubular material or a sheet material (which is then converted into tubular form) in order to perform friction stir processing across a cross-section of the tubular material. The continuous feed FSP systems and processes as described herein are thus advantageous in that the systems can be scaled to utilize or produce up to 24 inches diameter tubes or larger, that when cut and opened up can yield TiAl sheets as wide as 75 inches. These resulting TiAl sheets, in addition to having the superior ultrafine grain (UFG) properties, are greater in size than standard sheets width sizes for TiAl and other common titanium alloys produced using conventional FSP methods. For example, materials such as Ti-6Al-4V are conventionally produced in standard widths of only 48 inches. Furthermore, where conventional FSP methods use a Direct Powder Rolled (PR) sheet or tube billet or blank as the initial feedstock, the resulting material only achieves 60±20% densification as rolled. Typically, the resulting material then requires significant re-rolling, sintering, and I-lot Isostatic Pressing (HIP) to achieve higher densities up to 99%. The various systems and methods of FSP as described herein are configured to simultaneously perform grain refinement as well as densification of the initial feed material, without having to perform significant additional processing in order to produce the desired stiffened sheet product form.

Figure 6A:
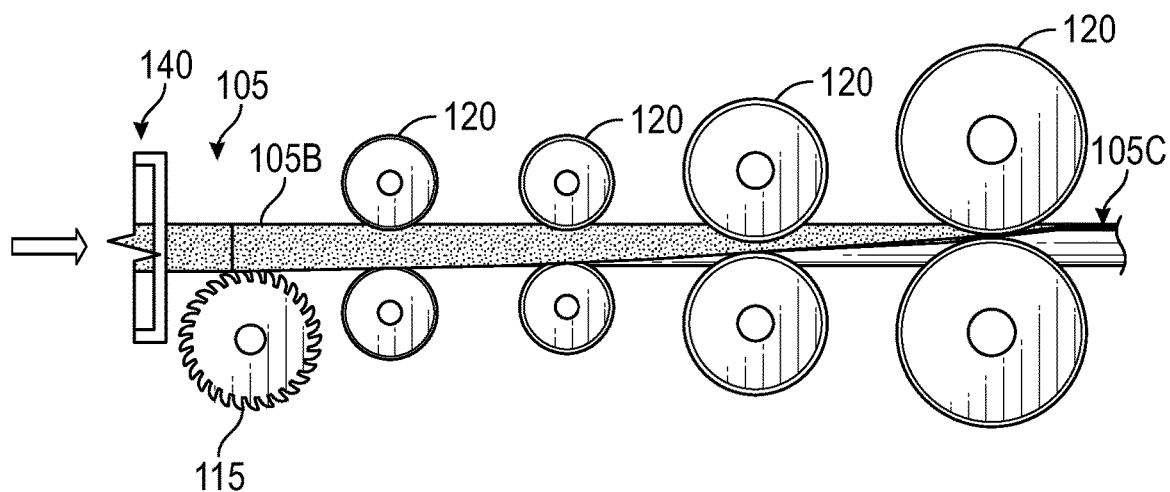
FIG. 6A illustrates a side view of a cutting and flattening stage of the continuous feed method of FIG. 1, according to some embodiments of the present disclosure.
Figure 6B:
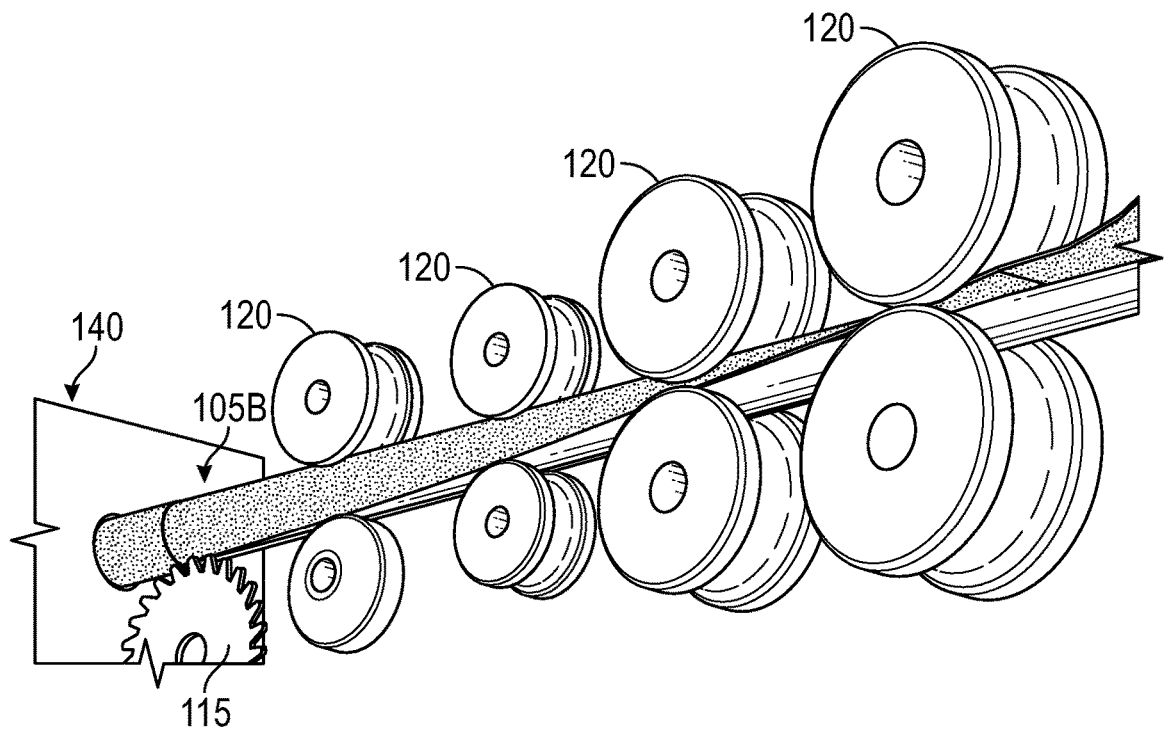
FIG. 6B a perspective view of the cutting and flattening stage of the continuous feed method of FIG. 1, according to some embodiments of the present disclosure.

FIG. 6A illustrates a side view of a cutting and flattening stage of the continuous feed method of FIG. 1, according to some embodiments of the present disclosure. FIG. 6B a perspective view of the cutting and flattening stage of the continuous feed method of FIG. 1, according to some embodiments of the present disclosure.

In the depicted embodiments, after the FSP stage, the tubular material 105 having the UFG microstructure is advanced out of the processing chamber 140 using the rollers 110. Upon exiting the chamber 140, the tubular material 105B is cut longitudinally with a blade, e.g., a slitting saw 115 while pinch rollers begin opening up the tube. The pinch rollers 120 open up the cut tubular material 105B while avoiding contact with rotating mandrel 135. As illustrated, the pinch rollers 120 flatten out the tubular product 105B into a sheet form by passing the opened-up tubular material 105B between pairs of the pinch rollers 120 disposed about the rotating mandrel 135, without actually contacting the rotating mandrel 135. As illustrated, the pinch rollers 120 may increase successively in size as they approach the motor 130, so as to sufficiently flatten the material as it opens up from the tubular form into sheet form.

In the depicted embodiments, the blade, e.g., slitting saw 115 is illustrated as being positioned below the rotating mandrel 135, however, the various embodiments described herein are not limited to this specific configuration. In some embodiments, the blade, e.g., slitting saw 115 may be positioned above the mandrel. In yet other embodiments, a second blade, e.g., slitting saw 115, may be positioned directly above the mandrel to cut the tubular material 105B exiting the chamber 140 simultaneously with the first blade. This configuration allows the tubular material 105B to be split into 2 halves and diverted away to opposing sides of the motor 130 in the material diverting stage (described below). In these embodiments, the two halves of the tubular material can then be flattened with rollers, or subsequently superplastic formed into flat sheets or other desired profiles. In yet other embodiments, in lieu of the blade, e.g., slitting saw 115, a waterjet cutter, a laser cutter, or any other similar cutter may be used may be used to cut through the tubular material 105B. Accordingly, the systems and methods described herein are directed to achieving UFG microstructures, and therefore increased ductility that will provide a resulting TiAl material in a more viable sheet form. In this UFG sheet form, the TiAl can then be used for desired manufacturing applications, e.g., aerospace and defense to name a few. In contrast, as briefly described above, conventional FSP methods lack the ability to produce TiAl having UFG microstructure in a plate, sheet, or stiffened structural product form due to difficulty, and poor room temperature ductility (1-3% elongation) of the pre-processed TiAl. The low ductility of the TiAl translates to very limited formability and workability of the products of conventional FSP TiAl methods. In accordance with the various embodiments described herein, the continuous feed FSP process can be scaled utilize or produce up to 24 inches diameter tubes or larger, that when cut and opened up can yield TiAl sheets as wide as 75 inches, which is greater than standard sheets widths for TiAl and other common titanium alloys such as Ti-6Al-4V that is produced in standard widths of only 48 inches.

In accordance with some embodiments, since intermetallic alloys such as TiAl are extremely brittle at room temperature, the starting tubular TiAl material 105A may be progressively heated until it reaches beyond its Brittle to Ductile Transition Temperature (BDTT). In some embodiments, the progressive heating may occur before the FSP stage begins on the tubular feed material 105A. The heating may serve the purpose of preventing the TiAl material 105A from cracking during the FSP stage. Additionally, the material 105B may be heated after the FSP stage, for example in at least one of the cutting and flattening stage, or the material diverting stage (illustrated in FIG. 7A) to further prevent cracking during these stages. In some embodiments, the progressive heating may be performed with the use of argon shielding to prevent oxidation of the tubular material at elevated temperatures. Additionally, the intermetallic feedstock such as TiAl can start as a Direct Powder Rolled (DPR) sheet or tube that has been consolidated from elemental powders.

Figure 7A:
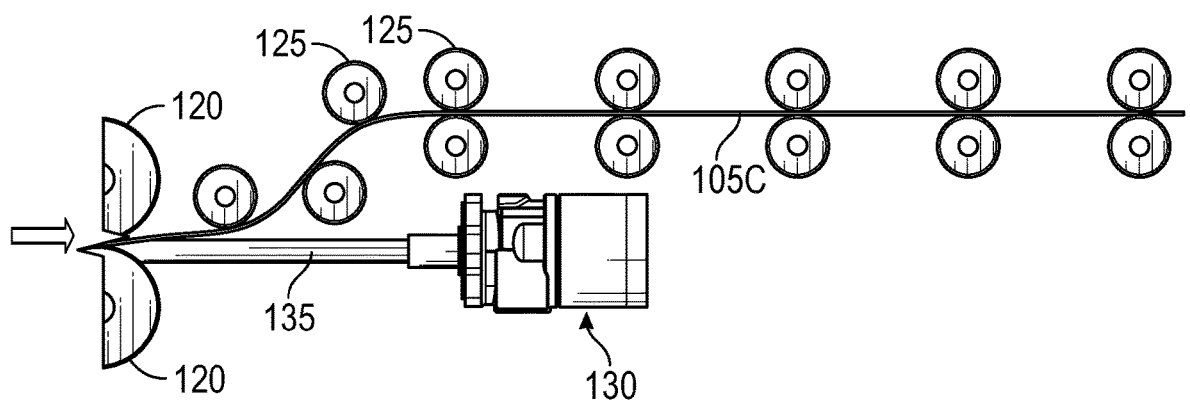
FIG. 7A illustrates a side view of a material diverting stage of the continuous feed method of FIG. 1, according to some embodiments of the present disclosure.
Figure 7B:
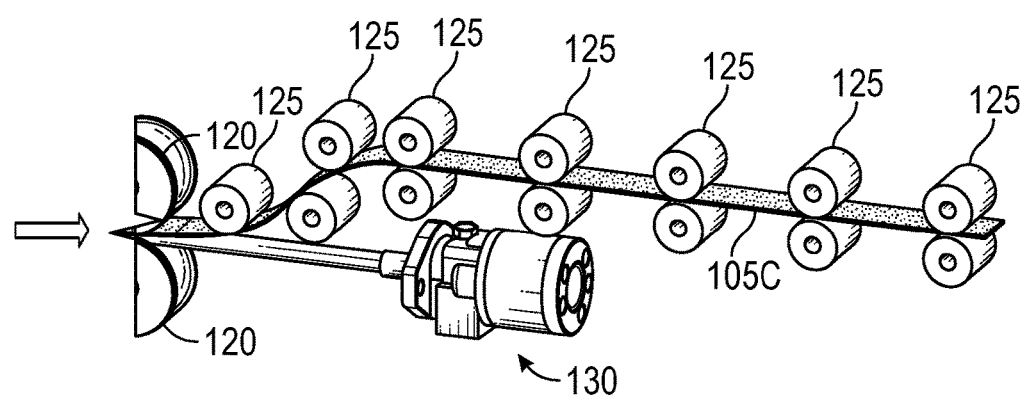
FIG. 7B a perspective view of the material diverting stage of the continuous feed method of FIG. 1, according to some embodiments of the present disclosure.

FIG. 7A illustrates a side view of a material diverting stage of the continuous feed method of FIG. 1, according to some embodiments of the present disclosure. FIG. 7B a perspective view of the material diverting stage of the continuous feed method of FIG. 1, according to some embodiments of the present disclosure. In the depicted embodiments, after the cutting and flattening stage, the flattened sheet material is passed between a series of pairs of pinch rollers 125 positioned so as to divert the flattened sheet material 105C away from the motor 130 which drives the mandrel 135. In the depicted embodiments, the flattened sheet material 105C is diverted to a position above the motor 135, however, the various embodiments are not limited to this specific configuration. In some embodiments, the flattened sheet material 105C may be diverted to a position below the motor 135, to avoid contact therewith.

Figure 8:
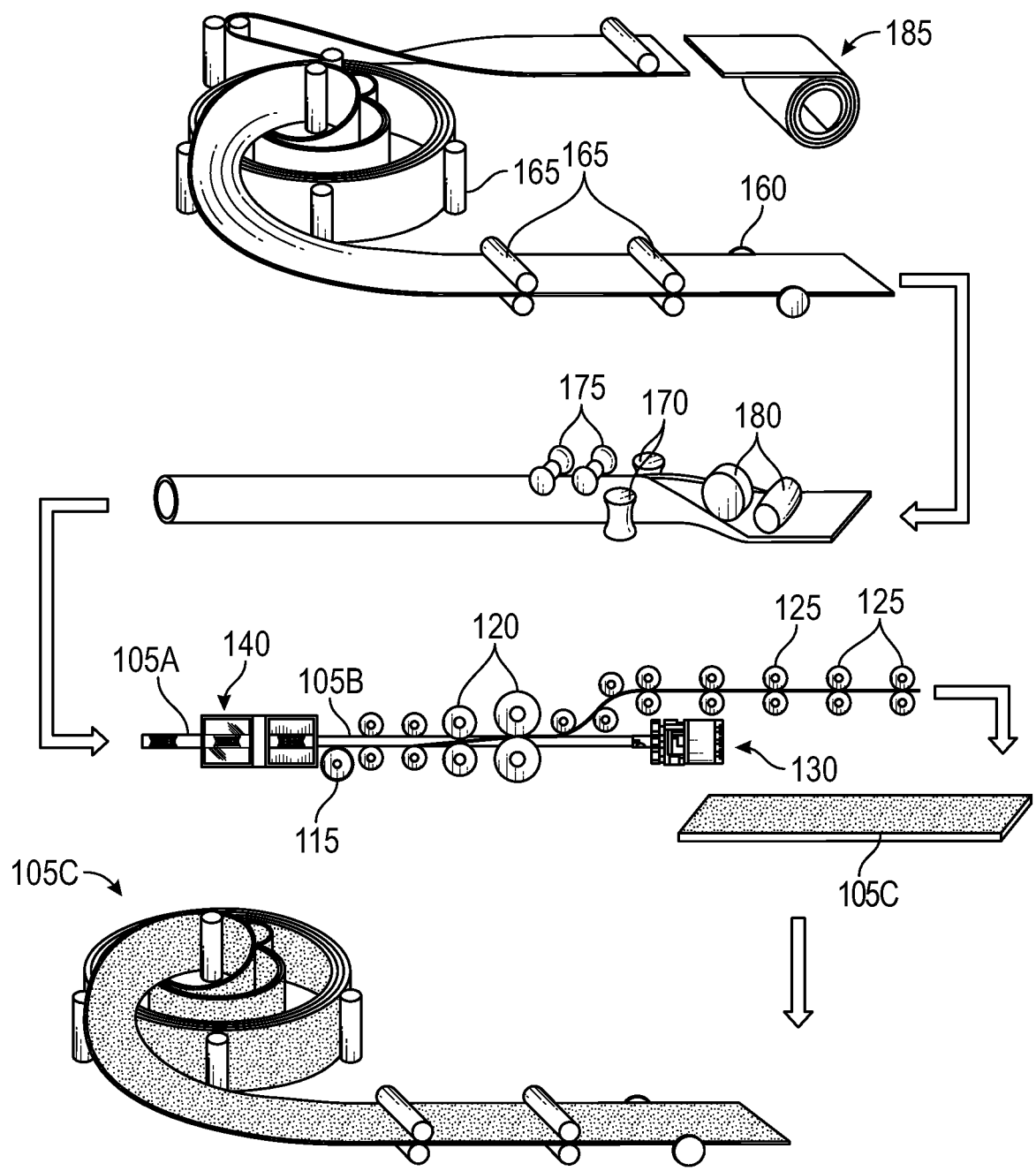
FIG. 8 illustrates a process flow for a continuous feed method for friction stir processing, according to some embodiments of the present disclosure.

FIG. 8 illustrates a process flow for a continuous feed method for friction stir processing, according to some embodiments of the present disclosure. In the depicted embodiments, various aspects of the present disclosure are directed to a process for continuous feeding FSP and product finishing where the initial continuous feed material 185 having the non ideal grain microstructure 185 is fed from the bulk source in sheet form, rolled into the tubular form 105A for FSP, and then flattened into sheet form in the same manner as the cutting and flattening stages described above. Accordingly, a detailed description thereof shall be omitted.

As illustrated in FIG. 8, the continuous feed material 185 may begin as a sheet material having the non-ideal grain microstructure (e.g., the pre-processed sheet form of TiAl having very poor room temperature ductility and limited formability and workability). In these embodiments, the continuous feed material 185 may be flat rolled using rollers 165, edge milled using edge mill 165, further flattened, using multiple rollers 180 with increasing radii (similar to rollers 120), and then rolled into tubular form using rollers 170 and 175 (as will be further discussed with respect to FIGS. 9A and 9B). Upon being rolled, the continuous feed material 185 may then take the same form as tubular feed material 105A described with respect to FIG. 1. From this point, the tubular feed material may then be subjected to the same FSP, cutting and flattening, and material diverting stages, in order to produce the sheet material having UFG microstructure 105C, as previously described.

Figure 9A:
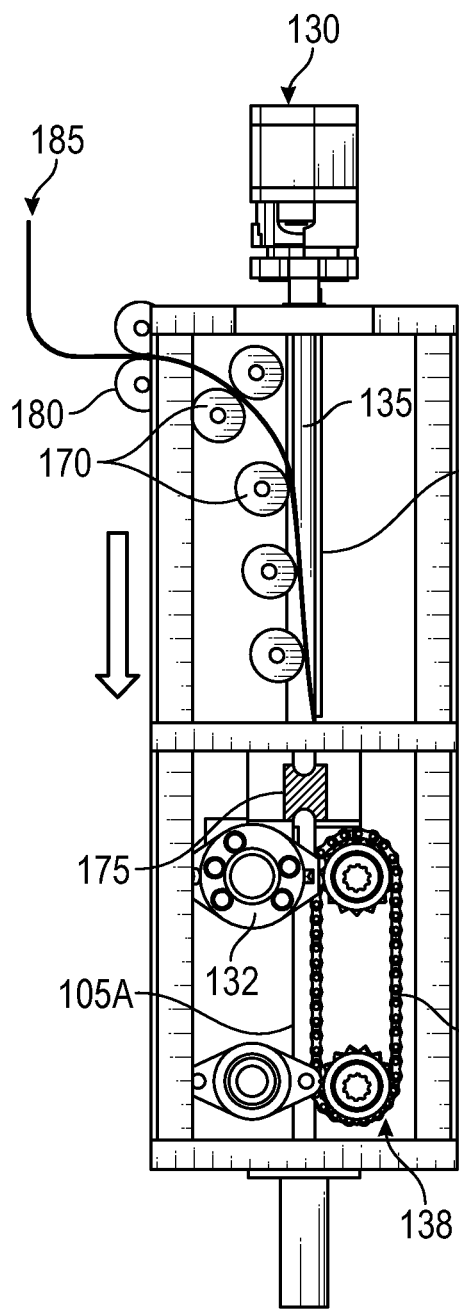
FIG. 9A illustrates a side view of a stage of forming sheet material into tubular form in the continuous feed method of FIG. 8, according to some embodiments of the present disclosure.
Figure 9B:
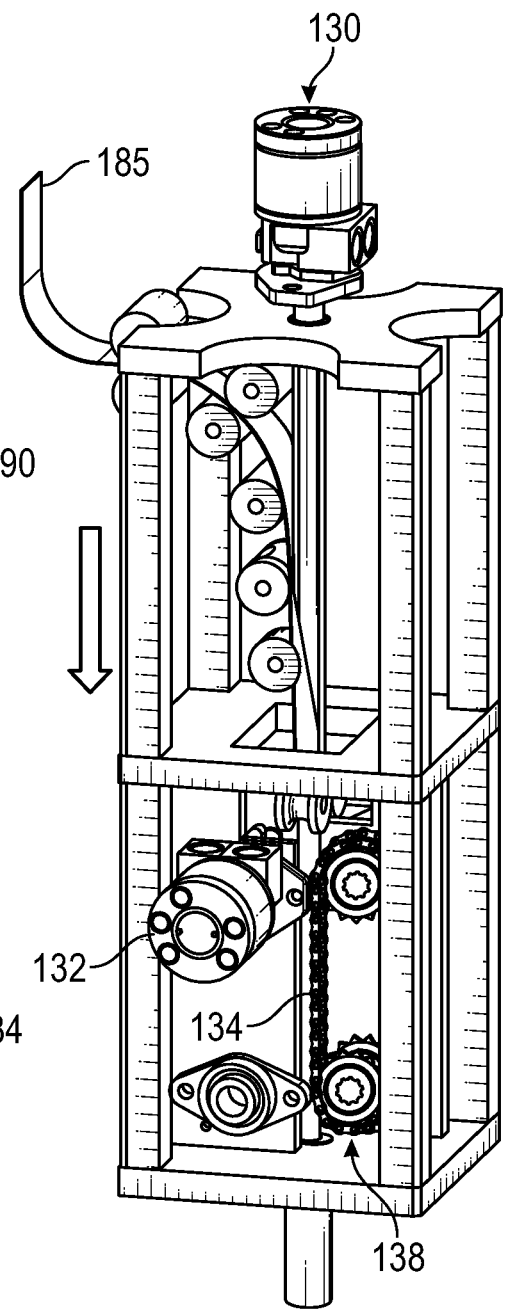
FIG. 9B is a perspective view of the stage of forming the sheet material into tubular form in the continuous feed method of FIG. 8, according to some embodiments of the present disclosure.

According to various embodiments of the present disclosure, as described above with respect to FIG. 8, the initial continuous feed material 185 having the non-ideal grain microstructure 185 may be fed from the bulk source in sheet form, and subsequently rolled into the tubular form 105A in order for FSP to be performed. FIG. 9A illustrates a side view of a stage of forming sheet material into tubular form in the continuous feed method of FIG. 8, according to some embodiments of the present disclosure. FIG. 9B is a perspective view of the stage of forming the sheet material into tubular form in the continuous feed method of FIG. 8, according to some embodiments of the present disclosure. FIG. 9C illustrates a stage of advancing the formed tubular material of FIGS. 9A and 9B to a textured portion of a rotating mandrel for friction stir processing.

As depicted in FIGS. 9A-9C, the continuous feed material begins as a flat sheet 185 and is successively pinch rolled into a tubular form around the rotating mandrel 135 using pinch rollers 170. In order to roll the sheet material 185 into tubular form, the rollers 170 may be reacted against a static sleeve 190 that is concentrically formed with the rotating mandrel 135 until the sheet 185 is rolled or folded into a nearly fully cylindrical tube (e.g., tubular feed material 105A), as illustrated in the bottom portions of FIGS. 9A and 9B. In some embodiments, as the sheet feed material 185 is formed into the tubular form, it can be welded, e.g., Tungsten Inert Gas (TIG) welded, laser welded, or electric resistance welded (ERW) to make a fully hermetic tube. In other embodiments however, as depicted in FIGS. 9A and 9B, the sheet 185 is rolled or folded into a nearly fully cylindrical tube 105A without actually being welded. As the pinch rollers, e.g. roller 175, continue to feed the tube downward, the tube 105A will be gripped continuously by a series of heavy duty grippers 134 that rotate around a chain and sprocket system 138 applying constant force. The motors 130 and 132, as well as spacing of grippers 134 may be controlled by a closed loop control feedback system.

FIG. 10 is an enlarged partial view illustrating advancement of the tubular material of FIG. 9C to the textured portion of the rotating mandrel for friction stir processing. As illustrated in FIG. 10, the tubular material 105A continues to be forced downwards into a cylindrical chamber 150 for performance of FSP. In the cylindrical chamber, the tubular material 105A heats up from the friction of the spinning mandrel 135 until it reaches the textured portion 145 of the mandrel 135 that friction stir processes the tubular material 105A and causes SPD and grain refinement of the tubular material 105A to the material 105B having the UFG microstructure, as previously discussed. In accordance with some embodiments, as the UFG microstructure tube 105B exits the chamber 150 it may be deposited on a substrate while the cylindrical chamber 150 remains static (although it could rotate as well). The various embodiments as described herein are capable of performing FSP and AFS with a static shoulder 196 and rotating pin 197 that are configured to engage with the substrate. The rotating mandrel 135 with textured portion 145 assists with forcing the material out of the chamber 150 onto the substrate 198 while the shoulder 196 of the static chamber 150 maintains positional or force control to apply pressure to the material onto the substrate. In some embodiments, the entire assembly setup may translate along the substrate length to deposit the material having the UFG microstructure. Alternatively, the assembly setup can remain stationary and a moving table/turntable may allow material to be deposited on the substrate in additive layers.

According to various aspects of the present disclosure, the bore of the chamber and the mandrel may also be conical in profile where the tube is progressively narrowed in diameter such that it is extruded into a rod profile within the chamber before being deposited on the substrate in the solid state.

As previously described above, the starting intermetallic feedstock with the non-ideal properties, e.g., the pre-processed TiAl, can start as a Direct Powder Rolled (DPR) sheet or tube that has been consolidated from elemental powders. This form of TiAl, where conventionally used comes in the form of DPR sheets or tubes, called "green strips", which only achieve 60±20% densification as rolled and consolidated. Typically, these forms require significant re-rolling, sintering, and Hot Isostatic Pressing (HIP) to achieve higher densities up to 99%. Thus, the various embodiments described herein are intended to simultaneously perform grain refinement as well as densification with the FSE and AFS processes.

In accordance with various embodiments, the continuous feeding FSP systems and methods described herein advantageously enable economically-viable production of materials with UFG microstructures. Conventional FSP methods are capable of producing materials having finer grain microstructure only through very extensive, multi-step thermomechanical processing and heat treatment. Additionally, the UFG microstructure size achieved with FSP methods of the various embodiments described herein is superior to the aforementioned conventional extensive, multi-step thermomechanical processing methods. In contrast to the extensive and expensive thermomechanical processing methods conventionally used, the systems and methods of the various embodiments described herein advantageously provide a continuous feeding method for producing metallic products having superior UFG microstructure and corresponding mechanical property enhancements at a high-volume and competitive cost. The economics of continuous feeding tube mill products (as described in various embodiments herein) versus traditionally extruded products are proven to be cheaper with the continuous processes.

In accordance with some embodiments, the tubular material 105A may be canned with another metallic alloy. For example, the TiAl tubular material 105A may be sleeved externally with another metallic tubing (e.g., stainless steel, titanium, or Inconel) to form a bi-metallic tubing. In these embodiments, the inner TiAl tubular material 105A may be friction stir processed while contained by the outer metallic alloy tubing. During the friction stir processing of the inner TiAl tubular material 105A, a bond may be created between the two tubes. The bond may be either of a mechanical locking between the inner TiAl tube and the outer tube produced by the plastic deformation during the FSP stage, a diffusion bond resulting from the amount of pressure and heat generated during the FSP stage, or a combination of both bonds. In these embodiments, the external metallic tubing may further prevent oxidation of the TiAl tubing from occurring during FSP, or may increase the extrude ability and prevent cracking of the TiAl tubing after FSP. The outer metallic tubing may be one having a higher ductility that then the inner TiAl tubing, and thereby higher resistance to fracture. Accordingly, the inner TiAl tubing which is susceptible to cracking during processing may take advantage of the ductile outer tubing material to prevent cracking.

A reference to an element in the singular is not intended to mean one and only one unless specifically so stated, but rather one or more. For example, "a" module may refer to one or more modules. An element proceeded by "a," "an,"

"the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A continuous feed method for friction stir processing, the method comprising:
    continuously feeding a tubular material having a first grain microstructure from a bulk source into a processing chamber;
    forcing the tubular material between a die and a textured end portion of a mandrel as the tubular material is advanced through the chamber;
    rotating the mandrel within the tubular material while forcing the tubular material across the textured end portion to friction stir process the tubular material and transform a structure of the tubular material from the first grain microstructure to a second grain microstructure,
    wherein the second grain microstructure is a finer equiaxed grain microstructure than the first grain microstructure; and
    converting the tubular material having the second grain microstructure into a stiffened sheet form.

2. The method of claim 1, wherein the tubular material comprises a metal alloy selected from the group consisting of intermetallic alloy Titanium Aluminide (TiAl) and TiAl metal matrix composites (MMC).

3. The method of claim 1, further comprising heating the tubular material to a Brittle to Ductile Transition Temperature (BDTT) thereof.

4. The method of claim 3, wherein the heating comprises at least one of:
pre-heating the tubular material prior to forcing the tubular material between the die and the textured end portion of the rotating mandrel; or
heating the tubular material after friction stir processing the tubular material.

5. The method of claim 4, further comprising argon-shielding the chamber to prevent oxidation of the tubular material at elevated temperatures during at least one of the preheating, or the heating after friction stir processing of the material.

6. The method of claim 1, wherein the textured portion comprises at least one of threads, ridges, studs, or protrusions.

7. The method of claim 1, wherein the friction stir processing comprises:
advancing the textured end portion of the mandrel into the die in conjunction with forcing the tubular material over the rotating mandrel using a tube gripper.

8. The method of claim 7, further comprising:
after the friction stir processing, cutting the tubular material along a length thereof to open up the tubular material as the material emerges from the chamber; and
flattening the open tubular material into the sheet form by passing the opened-up tubular material between a first series of pairs of pinch rollers disposed about the rotating mandrel, without contacting the rotating mandrel.

9. The method of claim 8, further comprising passing the flattened sheet material between a second series of pairs of pinch rollers positioned so as to divert the flattened sheet material away from a motor which drives the mandrel.

10. The method of claim 1, wherein the stiffened sheet form material having the second grain microstructure comprises a titanium aluminide (TiAl) sheet having a width of greater than 48 inches.

11. The method of claim 1, wherein the bulk source comprises a material in sheet form having the first grain microstructure, the method further comprising, prior to continuously feeding the material from the bulk source:
converting the sheet material into the tubular material having the first grain microstructure, the converting comprising advancing the sheet material between a series of pairs of pinch rollers and rolling the sheet material into a tubular form around a static sleeve concentrically disposed about the rotating mandrel.

12. The method of claim 11, further comprising gripping the tubular material formed using a series of grippers and forcing the tubular material into the processing chamber for friction stir processing.

* * * * *